United States Patent [19]

Yamamoto

[11] Patent Number: 5,186,690
[45] Date of Patent: Feb. 16, 1993

[54] AUTOTENSIONER

[75] Inventor: Ken Yamamoto, Iwata, Japan

[73] Assignee: NTN Corporation, Osaka, Japan

[21] Appl. No.: 828,360

[22] Filed: Jan. 30, 1992

[30] Foreign Application Priority Data

Jan. 31, 1991 [JP] Japan .................................. 3-2769
Jul. 31, 1991 [JP] Japan ................................. 3-60429

[51] Int. Cl.⁵ ............................................. F16H 7/08
[52] U.S. Cl. .................................... 474/135; 474/117
[58] Field of Search ............... 474/101, 109, 111, 113,
474/117, 133, 135, 138

[56] References Cited

U.S. PATENT DOCUMENTS

| | | |
|---|---|---|
| 5,030,172 | 7/1991 | Green et al. ........................ 474/135 |
| 5,073,148 | 12/1991 | Dec .................................. 474/135 X |
| 5,131,889 | 7/1992 | Meckstroth et al. ............ 474/135 X |

Primary Examiner—Thuy M. Bui
Attorney, Agent, or Firm—Wenderoth, Lind & Ponack

[57] ABSTRACT

A belt autotensioner having a support shaft secured to a pulley support surface of a stationary member. A pulley support is rotatably supported on the support shaft at an offset position. A tension pulley is rotatably supported on the pulley support. A spring coupling member is mounted on the pulley support. A tension adjusting spring is provided to bias the pulley support in a belt stretching direction by exerting a spring force on the spring coupling member. A damper is provided to dampen vibrations transmitted from the belt to the pulley support through the tension pulley. At least one of the spring coupling member and the tension adjusting spring is mounted on the pulley support at a side remote from the stationary member.

4 Claims, 7 Drawing Sheets

AUTOTENSIONER

This invention relates to an autotensioner for keeping the tension of a belt constant.

In an automotive engine, a timing belt is ordinarily used to drive camshafts. If the timing belt is provided far apart from the engine block, the rigidity of the crankshaft and camshafts tends to be lower and the engine length tends to increase. Thus, the timing belt should be provided as near to the engine block as possible.

A belt power transmission device using a timing belt is ordinarily provided with a belt tensioner to keep the tension of the timing belt constant because abnormal in tension might cause the belt to skip some of the teeth of the engaging gear or the breakage of the belt.

Figure 13:
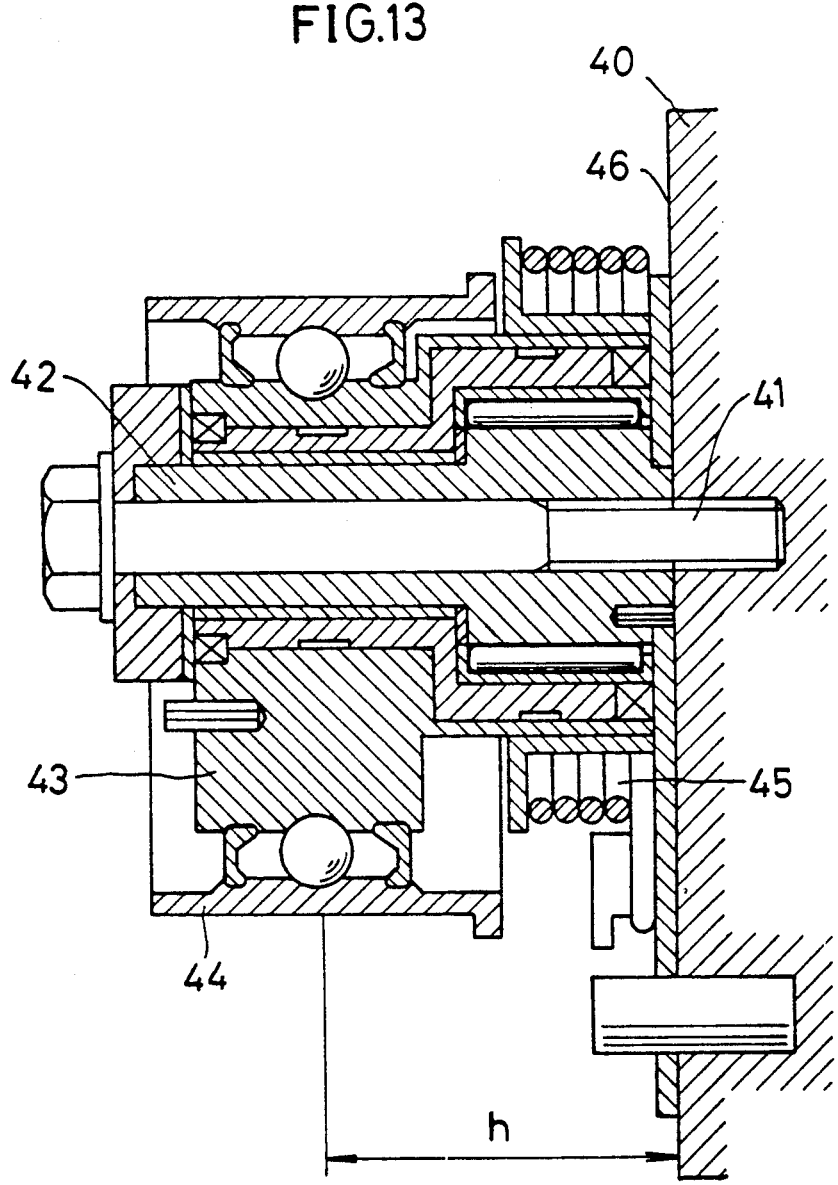

FIG. 13 shows a belt tensioner disclosed in Unexamined Japanese Utility Model Publication 3-354. This belt tensioner comprises a cylindrical support shaft 42 mounted on an engine block 40 by tightening a bolt 41, a pulley support 43 rotatably supported on the support shaft 42 in eccentric relation with respect to the support shaft 42, and a tension pulley 44 rotatably supported on the pulley support 43. A torsion coil spring 45 is pressed against the pulley support 43 to press the tension pulley 44 against the belt and thus to keep the tension of the belt constant.

Since such a belt tensioner has a structure in which the torsion coil spring 45 for adjusting tension is disposed between the engine block 40 and the tension pulley 44, height h from a pulley support surface 46 of the engine block 40 to the center of the tension pulley 44 is rather large. Thus, the timing belt cannot be mounted near the engine block 40.

With a fixed type belt tensioner, the timing belt can be mounted near the engine block. If this fixed type belt tensioner is replaced with a movable type belt tensioner as shown in FIG. 13, the life of the timing belt could be extended. But this is impossible because the height to the center of the tension pulley 44 is increased.

A technical object of this invention is to reduce the height from the pulley support surface to the center of the tension pulley.

In order to solve the above problems, according to this invention, there is provided a belt autotensioner comprising a support shaft secured to a pulley support surface of a fixing member, a pulley support rotatably supported on the support shaft at its portion offset from the center of the support shaft, a spring coupling member mounted on the pulley support, and a tension adjusting spring for biasing the pulley support in a direction in which a belt is stretched taut by exerting a spring force on the spring coupling member, characterized in that at least one of the spring coupling member and the tension adjusting spring is mounted on the pulley support at a side thereof remote from the fixing member.

If the spring coupling member is provided on the pulley support at its side remote from the fixing member, a spring coupling piece is provided on the spring coupling member so as to extend axially while keeping a predetermined distance from the outer periphery of the pulley, and the tension adjusting spring is coupled to an end of the spring couling piece. Otherwise, one end of the spring coupling member is mounted on the pulley support at its end remote from the fixing member and a tension adjusting spring having a spring force in the circumferential direction thereof is coupled to the other end of the spring coupling member.

If the tension adjusting spring is mounted on the pulley support at its side remote from the fixing member, a spring coupling piece is formed on the spring coupling member so as to extend axially while keeping a predetermined distance from the outer periphery of the tension pulley, and the tension adjusting spring is coupled to an end of the spring coupling piece.

With this arrangement, the tension pulley can be mounted nearer to the pulley support surface of the fixing member by a distance equal to the height of at least one of the spring coupling member and the tension adjusting spring. This makes it possible to reduce the height from the pulley support surface of the fixing member to the center of the tension pulley.

The arrangement of this invention makes it possible to replace a conventional fixed type autotensioner with the device according to this invention.

Further, since the tension adjusting spring is mounted on the pulley at its side remote from the fixing member, it can be mounted at the last assembling stage, so that the autotensioner can be assembled easily.

Figure 1:
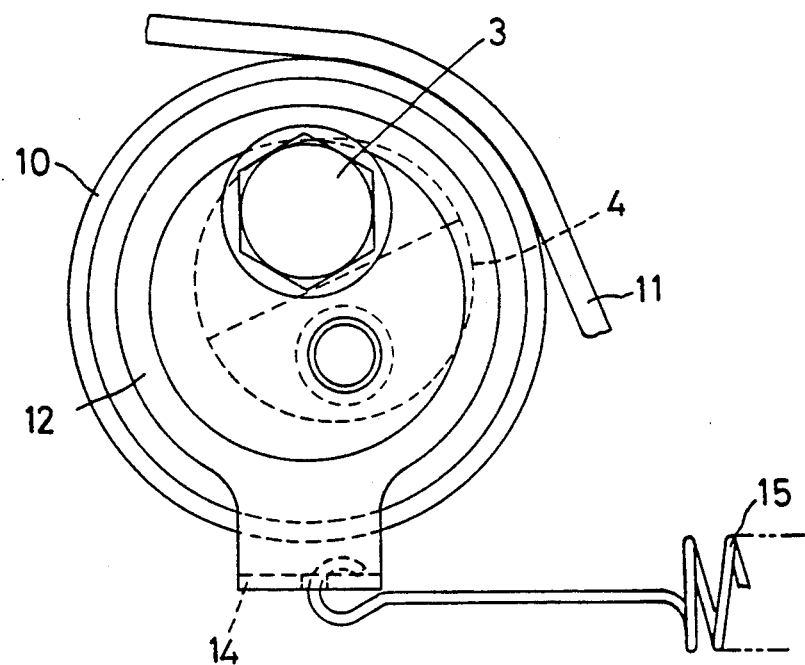
Figure 2:
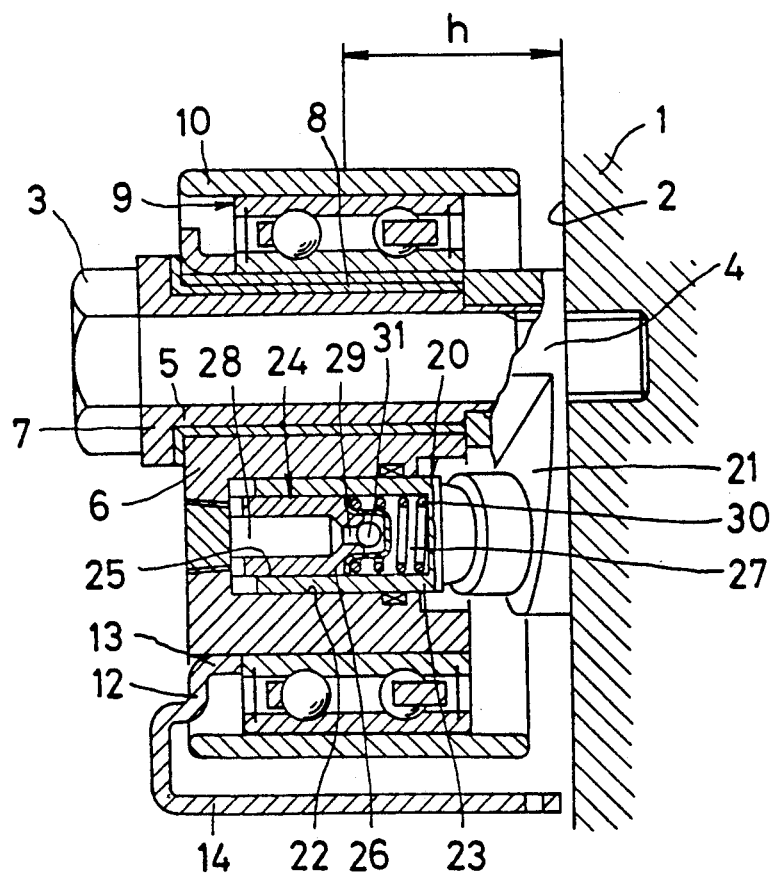
Figure 3:
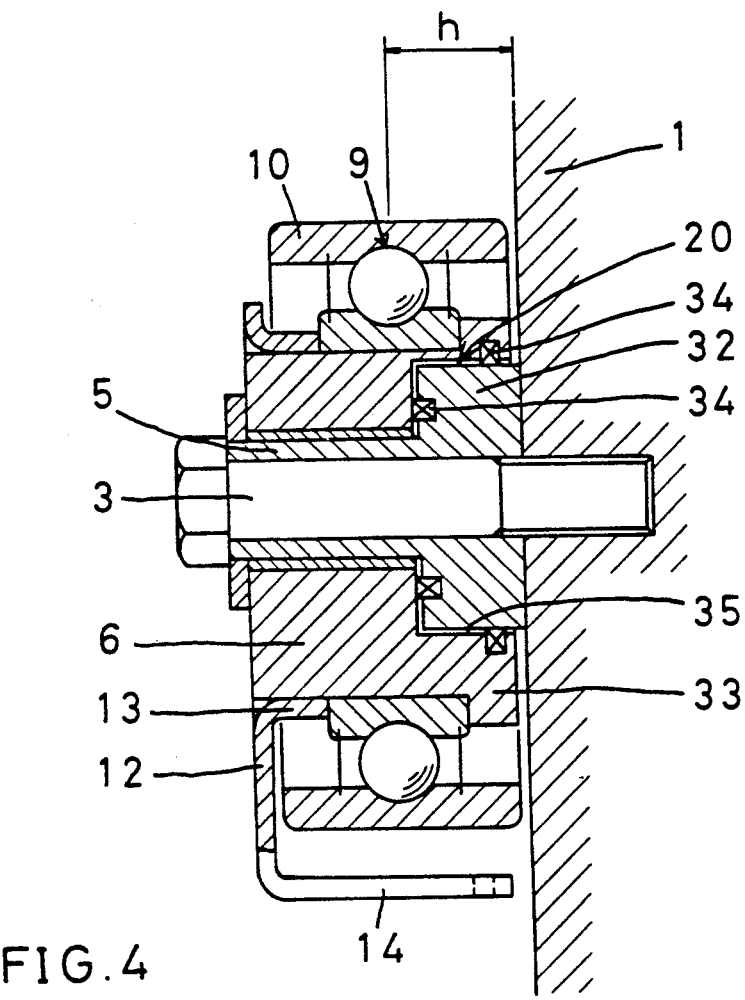
Figure 4:
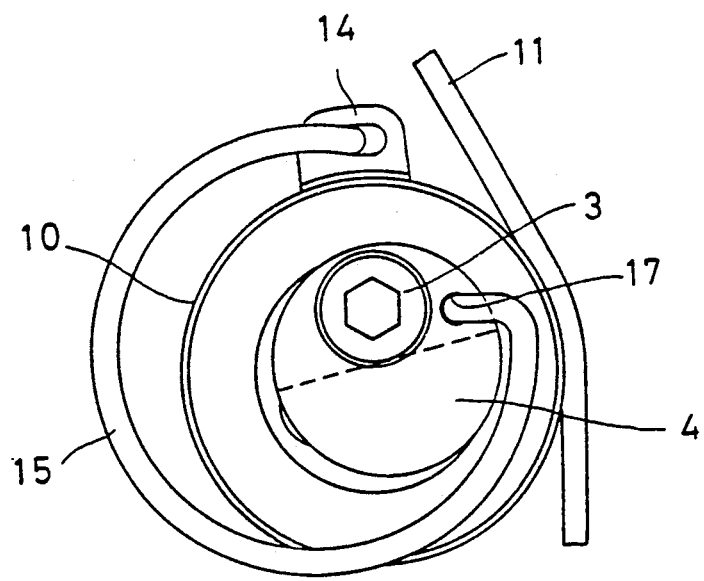
Figure 5:
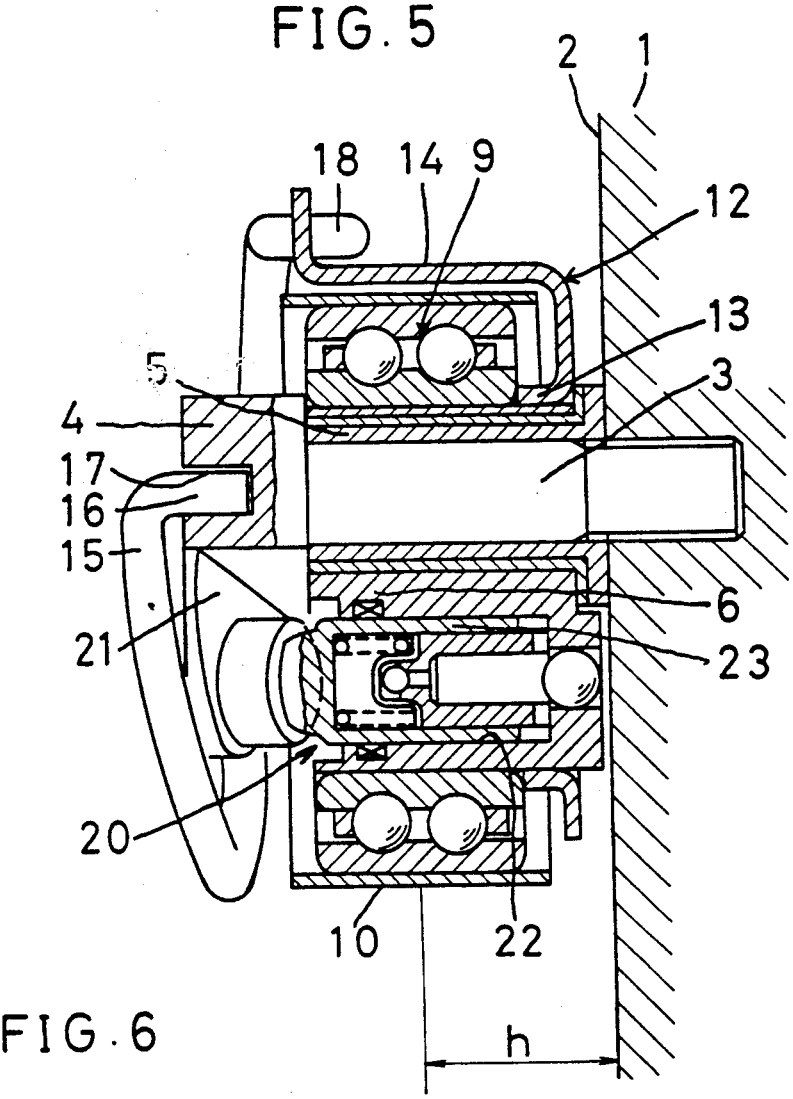
Figure 6:
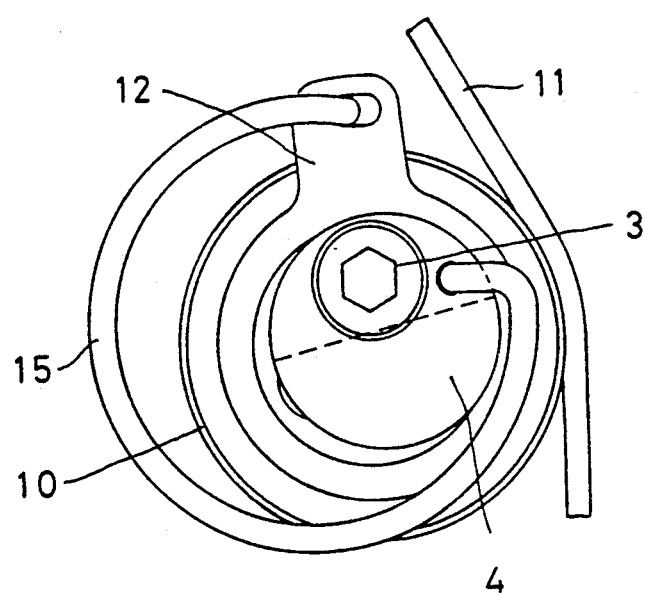
Figure 7:
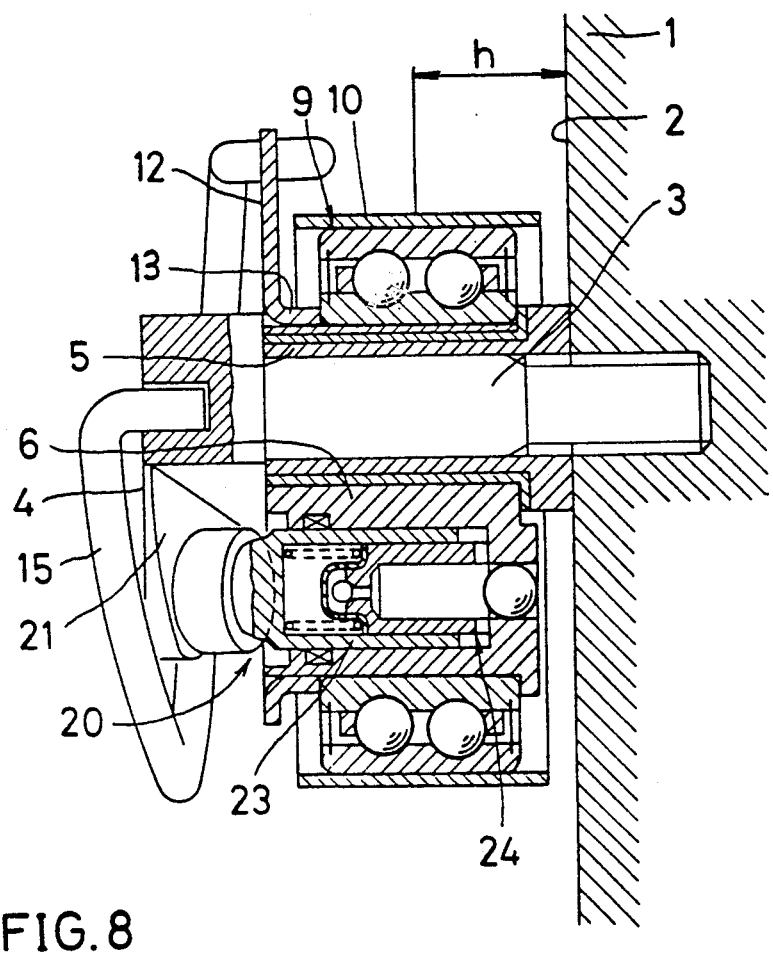
Figure 8:
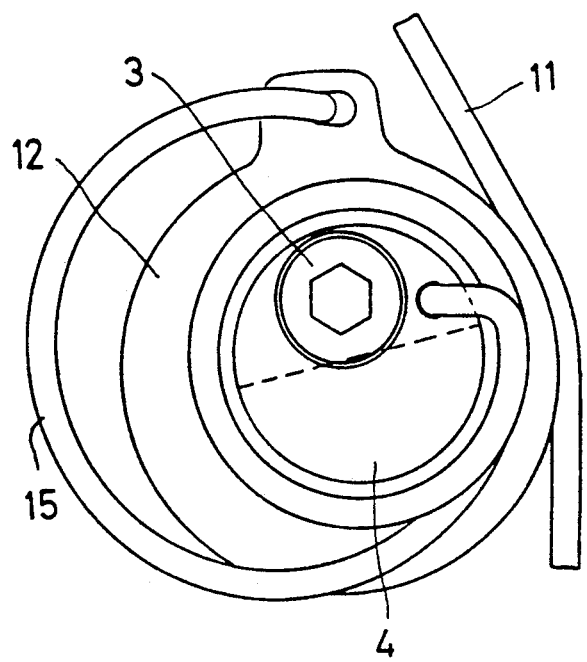
Figure 9:
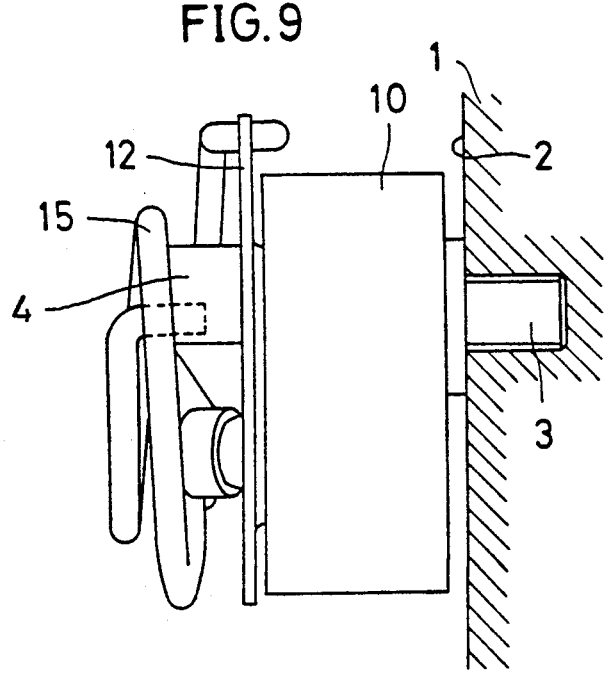
Figure 10:
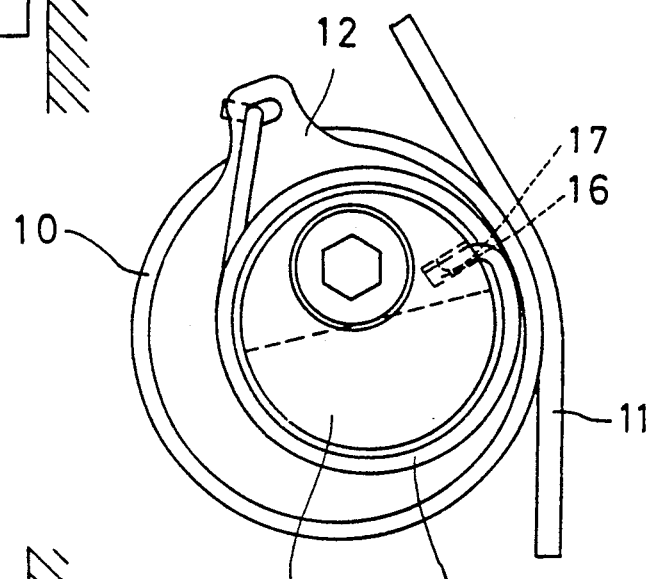
Figure 11:
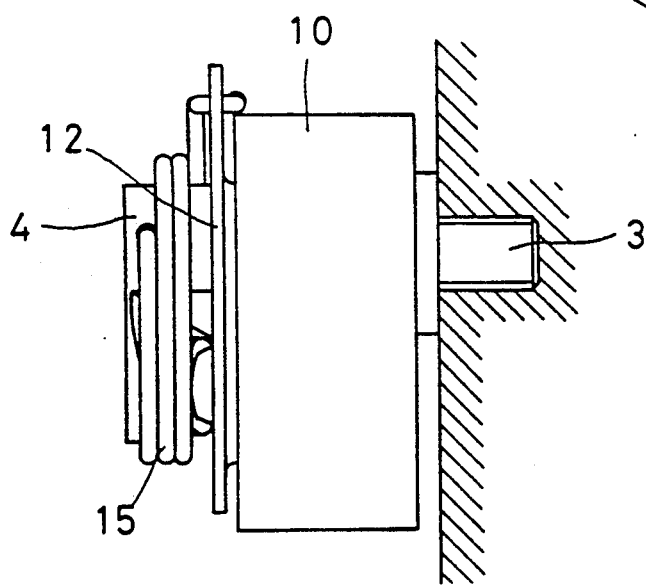
Figure 12:
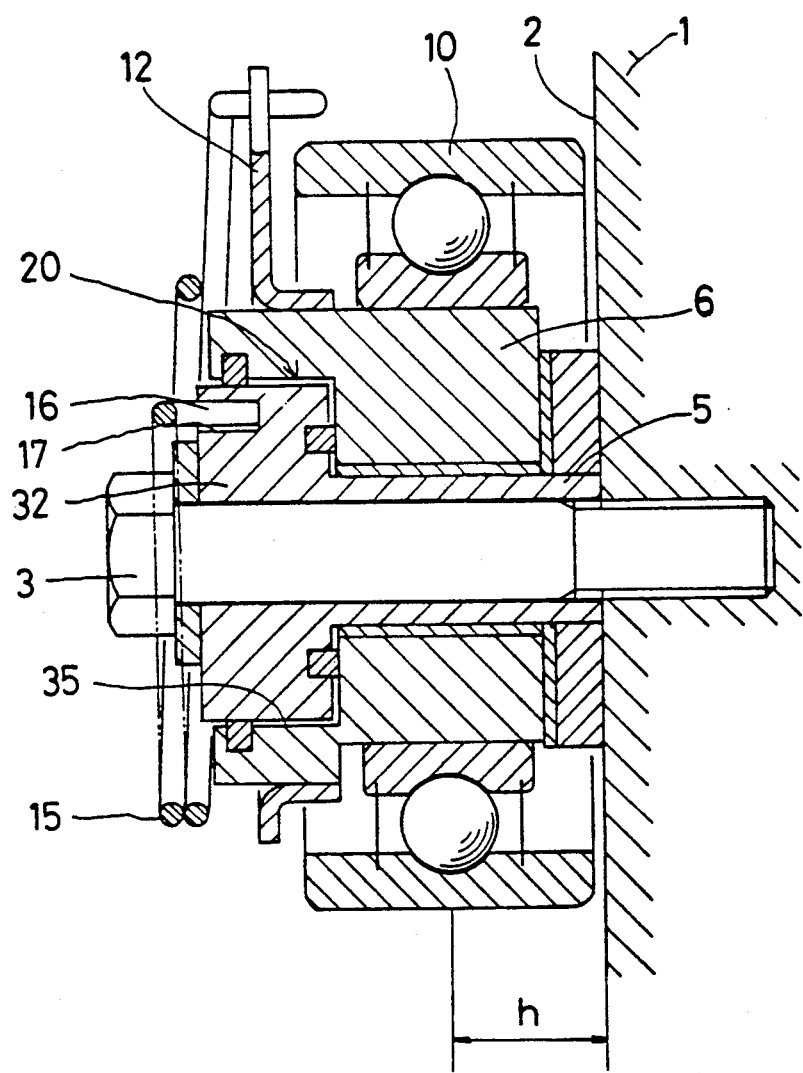

Other features and objects of the present invention will become apparent from the following description taken with reference to the accompanying drawings, in which:

FIG. 1 is a front view of a first embodiment of the belt autotensioner according to this invention;
FIG. 2 is a vertical sectional side view of the same;
FIG. 3 is a side view of a second embodiment;
FIG. 4 is a front view of a third embodiment;
FIG. 5 is a vertical sectional side view of the same;
FIG. 6 is a front view of a fourth embodiment;
FIG. 7 is a vertical sectional side view of the same;
FIG. 8 is a front view of a fifth embodiment;
FIG. 9 is a side view of the same;
FIG. 10 is a front view of a sixth embodiment;
FIG. 11 is a side view of the same;
FIG. 12 is a vertical sectional side view of a seventh embodiment; and
FIG. 13 is a vertical sectional side view of a prior art belt autotensioner.

As shown in FIGS. 1 and 2, a bolt 3 is threaded into a pulley support surface 2 of an engine block 1 as a stationary member. A base 4 and a cylindrical support shaft 5 mounted on the base 4 are secured in position by tightening the bolt 3.

A pulley support 6 is supported on the support shaft 5 so that the center of its outer peripheral surface is offset with respect to the support shaft 5. The pulley support 6 is prevented from axial movement by the base 4 and a flange 7 provided on the support shaft 5 and is rotatably supported by a bearing 8 mounted around the support shaft 5.

A tension pulley 10 is rotatably mounted around the pulley support 6 through a bearing 9. A belt 11 is guided by the tension pulley 10.

The pulley support 6 has a spring coupling member 12 mounted on its end remote from the engine block. The spring coupling member 12 includes a cylindrical portion 13 and a spring coupling portion 14 and has the cylindrical portion 13 press-fitted onto the outer peripheral surface of the pulley support 6 at one end thereof. In this assembled state, the spring coupling portion 14 extends axially while keeping a predetermined spacing from the outer peripheral surface of the tension pulley 10.

A tension adjusting spring 15 in the form of a tension coil is coupled to the end of the spring coupling portion 14. The spring 15 tends to pivot the pulley support 6 in a direction to stretch the belt taut to press the tension pulley 10 against the belt 11.

A damper 20 is provided to absorb any vibration applied from the belt 11 to the tension pulley 10.

It further includes a cylinder chamber 22 provided in the pulley support 6 opposite to the tapered cam surface 21 and a plunger 23 slidably mounted in the cylinder chamber 22 and pressed by a pressure device 24 against the tapered cam surface 21.

The damper 20 includes a tapered cam surface 21 formed on the base 4. The cam surface 21 is tapered so that the plunger 23 will protrude away from the pulley support 6 when the pulley support 6 pivots in such a direction that the belt is stretched taut.

The pressure device 24 has an axial hole 25 that opens to the rear end of the plunger 23. A piston 26 is mounted in the hole 25. A pressure chamber 27 is defined between the front end of the piston 26 and the bottom of the hole 25. The pressure chamber 27 and a reservoir chamber 28 formed behind the piston 26 communicate with each other through a passage 29 formed in the piston 26. The pressure chamber 27 contains a spring 30 and a check valve 31 for opening and closing the passage 29. In this arrangement, when the plunger 23 is pushed in, the hydraulic oil in the pressure chamber 27 leaks through a gap between the plunger 23 and the piston 26 into the reservoir chamber 28, allowing the plunger 23 to retract gradually. On the other hand, when the plunger 23 is moved outward under the force of the spring 30, the check valve 31 will be opened, allowing the hydraulic oil in the reservoir chamber 28 to flow into the pressure chamber 27 through the passage 29. Thus, the plunger 23 can be moved outward quickly.

In this arrangement, when the tension of the belt 11 increases, the pulley support 6 will pivot about the support shaft 5 in the direction to slacken the belt, thereby pushing in the plunger 23 with the tapered cam surface 21. Since the plunger 23 is retracting gradually in this state, the pulley 10 will pivot slowly in the direction to slacken the belt.

On the other hand, when the tension of the belt 11 becomes smaller than the spring force of the tension adjusting spring 15, the pulley 10 will pivot in the direction in which the belt is stretched taut, so that the plunger 23 tends to move away from the tapered cam surface 21. But the spring 30 in the pressure chamber 27 causes the plunger 23 to move outwards instantaneously until it abuts the tapered cam surface 21, allowing the pulley 10 to move quickly in the belt stretching direction.

As described above, since the pulley 10 can pivot smoothly in response to the change in tension of the belt 11, the belt tension can be stabilized.

According to this invention, the spring coupling member 12 is mounted on the pulley support 6 at its side remote from the engine block. Thus, the pulley 10 can be mounted near the engine block 1. This makes it possible to reduce the height h from the engine block 1 to the center of the pulley 10 as compared with the conventional structure shown in FIG. 13 and thus to mount the belt 11 to be guided by the pulley 10 nearer to the engine block 1.

FIG. 3 shows the second embodiment of the belt autotensioner. In this embodiment, the damper device 20 shown in FIG. 2 is replaced with a different damper device 20 in which a stepped support shaft 5 is secured to the engine block by tightening the bolt 3, and in which the pulley support 6 is provided with a cylindrical portion 33 kept in engagement with a large-diameter shank 32 of the support shaft 5 to define an air gap 35 therebetween which is sealed by a pair of seals 34 and filled with viscous fluid, so as to absorb vibrations applied to the pulley support 6.

In this arrangement, too, the spring coupling member 12 is mounted on the pulley support 6 at the end thereof remote from the engine block. Thus, the height h from the engine block 1 to the center of the pulley can be reduced in the same manner as in FIG. 1.

FIGS. 4 and 5 show the third embodiment of the autotensioner. The third embodiment shows an example in which the base 4 having the tapered cam surface 21 and the tension adjusting spring 15 for pivoting the pulley support 6 in the belt stretching direction are mounted on the pulley support 6 at its side remote from the engine block.

The tension adjusting spring 15 is in the shape of a horse shoe and is provided at one end thereof with a bent portion 16 engaged in a hole 17 formed in the base 4.

The tension adjusting spring 15 is provided at the other end thereof with a bent portion 18 coupled to a spring coupling piece 14 of a spring coupling member 12 secured to the pulley support 6.

The spring coupling member 12 has a cylindrical portion 13 and a spring coupling piece 14. The cylindrical portion 13 is press-fitted on the pulley support 6 at its side nearer to the engine block. In this press-fitted state, the spring coupling piece 14 extends axially, spaced apart a predetermined distance from the periphery of the tension pulley 10.

As described above, by providing the tension adjusting spring 15 on the pulley support 6 at the side remote from the engine block, the height h from the pulley support surface 2 to the center of the pulley 10 can be reduced as in the embodiment shown in FIG. 2.

FIGS. 6 and 7 show the fourth embodiment of the autotensioner according to this invention. In this embodiment, the cylindrical portion 13 at one end of the spring coupling member 12 is press-fitted on the pulley support 6 at its side remote from the engine block. The tension adjusting spring 15 is coupled to the other end of the spring coupling member 12.

In this embodiment, by providing the spring coupling member 12 and the tension adjusting spring 15 on the pulley support 6 at its side remote from the engine block, the height h from the pulley support surface 2 to the center of the tension pulley 10 can be reduced.

FIGS. 8 and 9 show the fifth embodiment of the autotensioner according to this invention. In this embodiment, the tension adjusting spring 15 of the third embodiment is replaced with a spiral type spring.

FIG. 10 and 11 show the sixth embodiment of the autotensioner according to this invention. In this embodiment, the tension adjusting spring 15 is replaced by a coil-shaped spring having the same diameter. The spring 15 is provided at one end thereof with a bent portion 16 engaged in the hole 17 formed in the peripheral surface of the base 4.

FIG. 12 shows the seventh embodiment, in which the damper 20 of the second embodiment is mounted on the pulley support 6 at its side remote from the engine block. The bent portion 16 provided at one end of the tension adjusting spring 15 is engaged in a hole 17 formed in the end face of a large-diameter shank 32.

What is claimed is:

1. A belt autotensioner comprising a support shaft secured to a stationary member, a pulley support rotatably supported on said support shaft at an offset position, a tension pulley rotatably supported on said pulley support, a spring coupling member mounted on said pulley support, a tension adjusting spring for biasing said pulley support in a belt stretching direction by exerting a spring force on said spring coupling member, and a damper means for damping vibrations transmitted from said belt to said pulley support through said tension pulley, characterized in that at least one of said spring coupling member and said tension adjusting spring is mounted on said pulley support at a side thereof remote from said stationary member.

2. A belt autotensiner as claimed in claim 1, wherein said spring coupling member is mounted on said pulley support at a side remote from said stationary member, wherein said spring coupling member is formed with a spring coupling portion extending axially while keeping a predetermined distance from the outer periphery of said tension pulley, and wherein said tension adjusting spring is in the form of a coil spring coupled to an end of said spring coupling portion.

3. A belt autotensioner as claimed in claim 1, wherein said spring coupling member is mounted on said pulley support at a side remote from said stationary member, and wherein said tension adjusting spring has a spring force acting in a circumferential direction and is coupled to the other end of said spring coupling member.

4. A belt autotensioner as claimed in claim 1, wherein said tension adjusting spring is mounted on said pulley support at a side remote from said stationary member, wherein said tension adjusting spring is coupled to said spring coupling member, wherein said spring coupling member is mounted on the pulley support at its end near to said stationary member, wherein said spring coupling member is provided with a spring coupling portion extending axially while keeping a predetermined distance from the outer periphery of said tension pulley, and wherein said tension adjusting spring is coupled to an end of said spring coupling member.

* * * * *